United States Patent

[11] 3,593,835

| [72] | Inventors | Vincent Kneib;<br>Earl G. Kneib, c/o Kneib Mfg. Co., 6<br>Highway, both of St. Joseph, Mo. 56374 |
|---|---|---|
| [21] | Appl. No. | 822,948 |
| [22] | Filed | May 8, 1969 |
| [45] | Patented | July 20, 1971 |

[54] BALE LOADING MACHINE
9 Claims, 8 Drawing Figs.

[52] U.S. Cl. .................................................. 198/7,
198/99, 214/522
[51] Int. Cl. ...................................................... B65b 65/02,
B65g 37/00
[50] Field of Search ............................................ 198/7, 7
BL, 97, 99, 87, 233; 214/6, 522

[56] References Cited
UNITED STATES PATENTS
1,499,764   7/1924   Dutcher ........................ 198/7 X

| 2,327,494 | 8/1943 | Brown ................. | 198/7 X (BL) |
| 2,621,773 | 12/1952 | Coggins ................. | 198/99 X |
| 3,301,372 | 1/1967 | Malmgren .............. | 198/7 (BL) |
| 3,501,025 | 3/1970 | Jay .......................... | 214/519 X |

*Primary Examiner*—Edward A. Sroka
*Attorney*—Scofield, Kokjer, Scofield & Lowe

ABSTRACT: A field bale-loading machine having an upright mobile frame and an elevating conveyor for elevating bales to a level above an associated vehicle bed and including a bale discharge means connected to the frame and supportable at different angles of inclination with respect to the frame, for receiving bales from the elevating conveyor for laterally transporting bales away from the elevating conveyor and for discharging bales onto the bed.

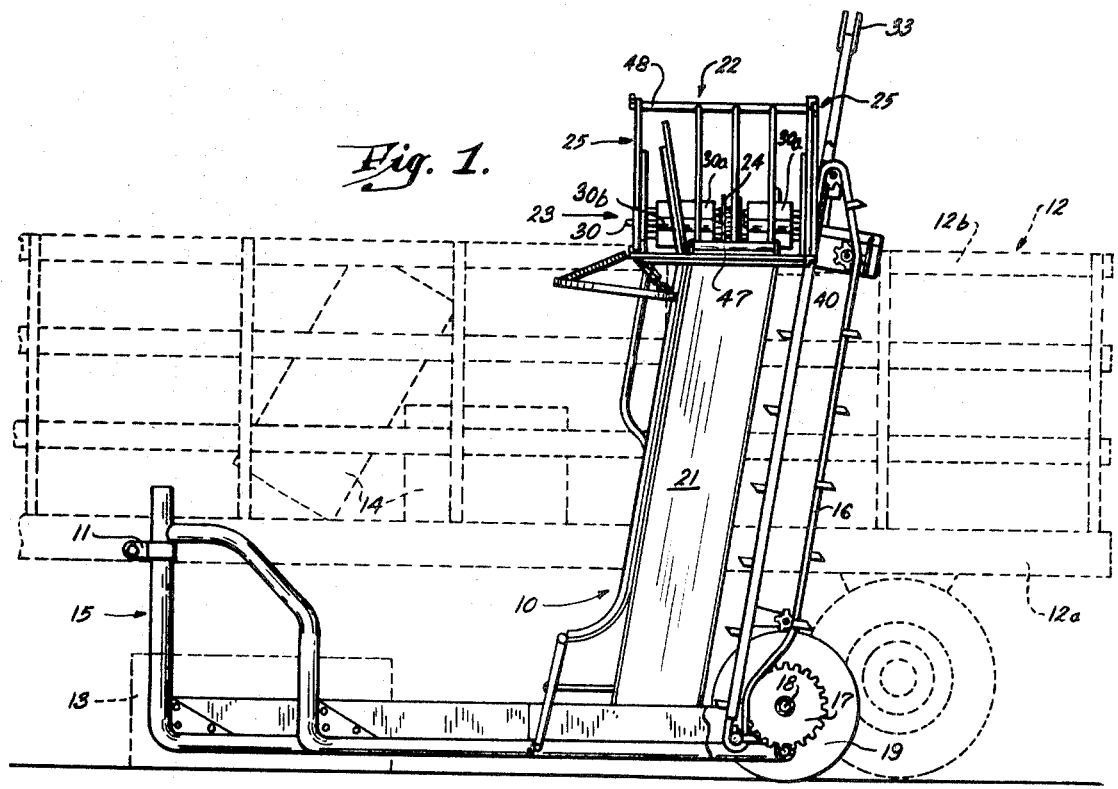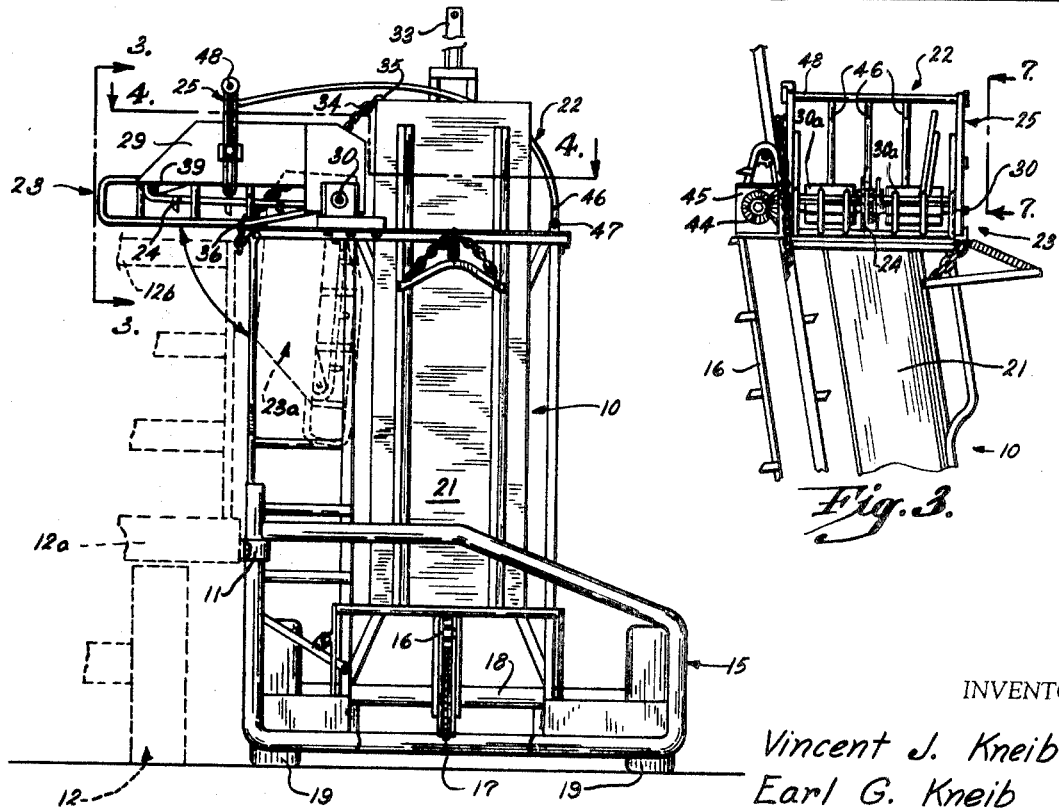

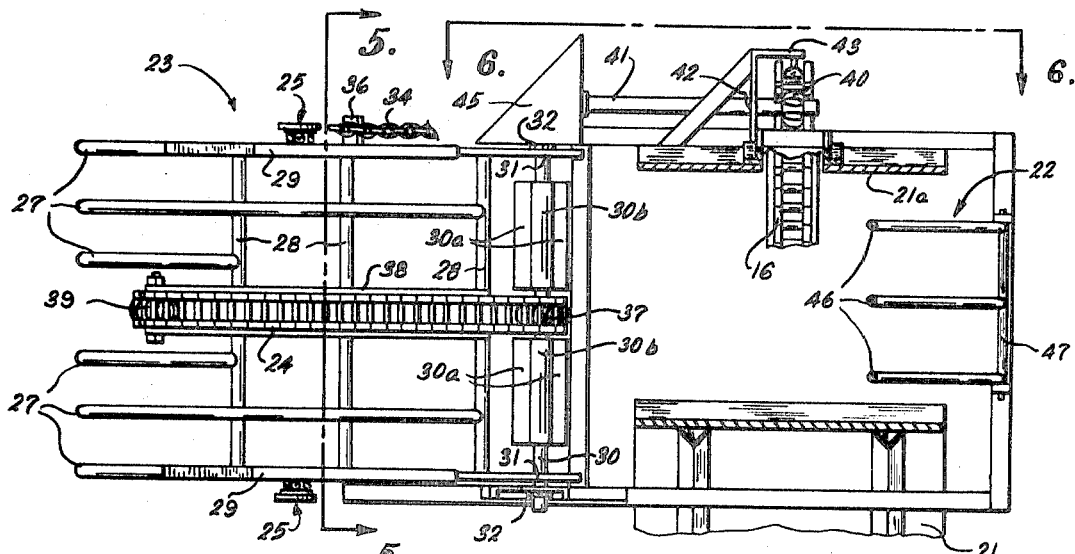
Fig. 4.
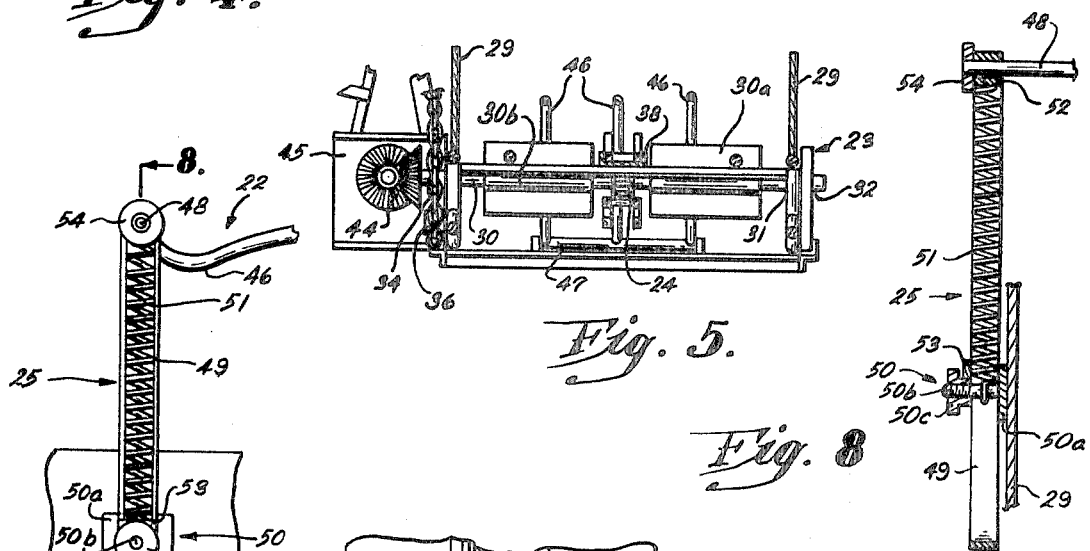
Fig. 5.
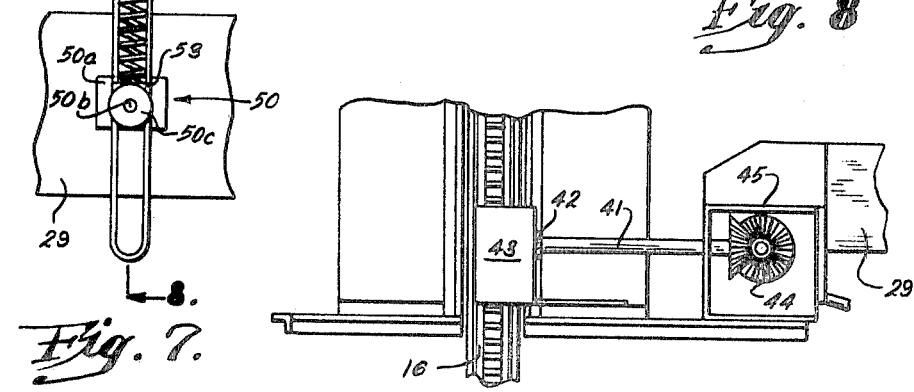
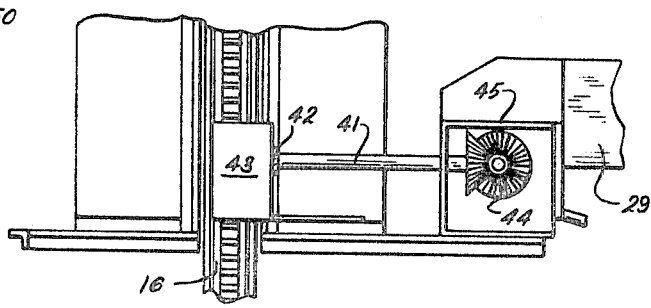
Fig. 7.
Fig. 6.
INVENTOR
Vincent J. Kneib
Earl G. Kneib

BALE LOADING MACHINE

Background and Summary of the Invention

U.S. Pats. No. 2,785,810 and 2,909,264 discloses a bale-loading machine that, when towed alongside a vehicle moving across a field, is operable to engage bales, elevate them to and deposit them on a platform on the bale-loading machine located above the vehicle bed. In using such a machine, a man standing on the bed of the vehicle manually removes the deposited bales from the platform and stacks them onto the vehicle bed. Since one man is also need to drive the vehicle across the field, this method bale-loading requires at least two men. In addition, stacking the bales on vehicle bed may be unnecessarily time consuming if the bales are to be restacked at another location.

A principal object of the present invention, therefore, is to provide a machine in which bale pick up and delivery to the vehicle bed is accomplished without requiring the presence of a person on the vehicle bed.

Another object of the invention is to provide a machine of the character described and which includes a lateral discharge conveyor so constructed as to be usable with a wide variety of vehicle configurations and which permits change from one vehicle to another or from one discharge height to another with a simple adjustment. It is a feature of the invention in this respect that a continuous drive to the discharge conveyor.

A further object of the invention is to provide a machine of the character described which is capable of handling both round and rectangular bales. A feature of our invention in this respect resides in the provision of an effective transition of the bale from the upright elevating conveyor to the lateral discharge conveyor for bales of both types and for maintaining a conveying relationship between the discharge conveyor and bale. The transition is effectively accomplished at different angular positions of the discharge conveyor without requiring more than the resetting of the angular relationship.

Other objects of the invention are to provide a machine of the character described which is easily collapsed to a transport condition for movement between fields or farms, which is simple in construction and requires a minimum of maintenance and which is safe in operation.

Other and further objects of the invention, together with the features of novelty appurtenant thereto, will appear in the course of the following description. Description of the Drawings In the accompanying drawings which form a part of the specification and are to be read in conjunction therewith and in which like reference numerals indicate like parts in the various views;

FIG. 1 is a side elevational view of a bale-loading machine showing a preferred embodiment of this invention, a portion of the bale-loading machine being broken away to show the driving mechanism of the elevating conveyor and the broken lines indicating field bales and the vehicle to which the bale-loading machine is connected;

FIG. 2 is a front elevational view of the bale-loading machine with portions of the vehicle indicated by broken lines;

FIG. 3 is a fragmentary, side elevational view along line 3–4 of FIG. 2 in the direction of the arrows;

FIG. 4 is an enlarged plan view, showing fragments of the frame and elevating conveyor, along line 4–4 of FIG. 2 in the direction of the arrows;

FIG. 5 is a sectional view along line 5–5 of FIG. 4 in the direction of the arrows;

FIG. 6 is a fragmentary elevational view along line 6–6 of FIG. 4 in the direction of the arrows;

FIG. 7 is an enlarged, fragmentary elevational view along line 7–7 of FIG. 3 in the direction of the arrows; and FIG. 8 is a sectional view along line 8–8 of FIG. 7 in the direction of the arrows. In FIGS. 1 and 2, a field bale-loading machine having an upright mobile frame 10 is shown attached through connection 11 alongside vehicle 12 moving to the left of FIG. 1 to load bale 13 on to vehicle bed 12a with bales 14.

As vehicle 12 pulls the bale-loading machine across the field, structure 15 guides bales 13 to endless, multitoothed elevating conveyor 16. Elevating conveyor 16 is driven by a sprocket wheel 17 rotating with axle 18 and ground-engaging wheels 19. teeth of elevating conveyor 16 engage the bale and elevate it through chute 21 to the upper end of frame 10.

The details of construction of the subject matter thus far described can be found in the disclosure of U.S. Pats. No. 2,785,510 and 2,909,264, to which reference has earlier been made.

When the bale reaches the upper end of frame 10, a curvilinear member 22 engages the bale and, as teeth of elevating conveyor 16 disengage, guides it onto discharge platform 23 and teeth of endless, multitoothed discharge conveyor 24. The latter transports the bale along discharge platform 23 extending over vehicle side railings 12b. During this time, curvilinear member 22 and assemblies 25 bias the bale toward discharge platform 23 and conveyor 24. When discharge conveyor 24 transports the bale to a position where curvilinear member 22 no longer engages it and the centroid of the bale extends past the end of discharge platform 23, the bale falls onto vehicle bed 12a.

As seen in FIG. 4, discharge platform 23 has a bale-supporting surface comprising rigidly spaced rod members 27 attached to a plurality of common transverse members 28. Side panels 29 (viewed in elevation in FIG. 2) are attached to the outermost rod members 27 to prevent bales from falling off the sides of discharge platform 23.

A discharge conveyor drive shaft 30 is mounted by bearings 31 in side panels 29 and is connected to frame 10 by bearings 32, allowing pivotal movement of discharge platform 23 with respect to frame 10 and drive shaft 30. The broken line view of discharge platform 23 in FIG. 2, generally designated by numeral 23a, indicates the position of discharge platform 23 disposed within the widthwise dimensions of the bale-loading machine as a whole in order that there is no dimensional increase when it is towed by hitch 33 from one location to another.

During bale-loading operation, a suspension chain 34 supports discharge platform 23 at a selected angle of inclination with respect to frame 10, the selected angle normally being determined by the height of side railings 12b. One end of chain 34 is attached to frame 10 at point 35. U-shaped member 36 is attached to discharge platform 23 and is operable to engage and releasably hold chain 34 at each link. Therefore, the length of chain between point 35 and U-shaped member 36 can be extended or shortened as desired, thus varying the angle of inclination of discharge platform 23 with respect to frame 10.

Associated with the discharge platform 23, and best viewed in FIG. 4, is the endless multitoothed chain-type discharge conveyor 24 which, as will be seen, is driven from the elevating conveyor 16. A sprocket wheel 37 is attached to discharge conveyor drive shaft 30 and operates to drive the discharge conveyor 24. A support in the form of a rigid channel member 38 supports the uppermost flight of discharge conveyor 24 to maintain the associated conveyor teeth above the bale-engaging surface of discharge platform 23. A sprocket wheel 39 is attached by bearings to the forwardmost end of channel member 38 between the side legs thereof and provides support for the outer end of the discharge conveyor. The shaft 30 carries, on either side of the sprocket 27, a series of longitudinally extending circumferentially spaced vanes or blades 30a which, in the illustrated embodiment, are secured to sleeves 30b keyed to shaft 41 for rotation therewith.

The driving of elevating conveyor 16 in turn drives a sprocket wheel 40, which as seen in FIGS. 1 and 4, is attached to a shaft 41 which extends through a bearing 43 supported by a sprocket housing member 43 (seen in FIG. 6) which is welded or otherwise affixed to the main frame of the machine.

Shaft 41 is drivingly connected to discharge conveyor drive shaft 30 by a bevel gear assembly 44. Shaft 44 and discharge conveyor drive shaft 30 are located in a gear housing 45 which has bearing supports for the respective shafts and which prevents debris from falling into and jamming gear assembly 44.

The bale-guiding member 22 includes a plurality of parallel curvilinear rod members 46 providing bale-engaging surfaces. One end of each rod member 46 is attached to transverse member 47 which is pivotally connected to frame 10 on the side opposite discharge platform 23. The other end of each rod member 46 is attached to transverse member 48 which in turn is connected to a pair of biasing assemblies 25, now to be described.

As seen in FIG. 4, the biasing assemblies 25 are on opposite sides of the discharge platform and are supported by side panels 29. FIG. 7 is an enlarged view of one such biasing assembly.

Each biasing assembly includes a longitudinally slotted elongate connector member 49, which is connected to side panel 29 by a bracket assembly 50. Bracket plate 50a is attached to side panel 29 and extending outwardly thereon is a threaded stub shaft 50b which passes through the slot of elongate member 49. A circular nut 50c threaded onto axle 50b retains the connector member 49 on shaft 50b while still allowing reciprocal and pivotal movement with respect to the axis of the shaft.

Each biasing assembly further includes a helical tension spring 51. The spring lies generally within the slot in connector member 49, having one end hooked to shaft 50b and the other to a bar 52 bridging the slot and secured to the connector member. The outer transverse member 48 of the guiding assembly passes loosely through the opening formed between the end of connector member 49 and the bar 52. A stop in the form of another bar 53 secured in the slot bears on threaded member 50c and limits downward displacement of connector 49. A washer 54 or other suitable retainer is attached at each end of transverse member 48 and serves to retain connector 49 thereto while allowing pivotal movement of the latter with respect to the axis of transverse member 48.

In operation, the bale loading machine is, as earlier noted, attached to the side of vehicle 12 and is drawn through the field with the vehicle as the latter advances. Bales 13 are approached by and directed into the throat of the bale loader and eventually are engaged and elevated by the front side of the elevating conveyor 16. If further details as to the basic nature of this part of the operation are desired, they can be obtained by reference to the U.S. patents earlier noted.

As the bale reaches the upper end of the loader, it is disengaged from the teeth of the elevator chain by the upright plate 21a through which the front flight of the elevating chain moves. Again, this is a feature which is disclosed in the patents earlier referred to. At the same time, the bale engages and is deflected laterally by the undersurfaces of the transverse rods 46 of the guide means 22. These rods deflect the bale laterally toward and into contact with the teeth on the conveyor chain 24, which is being driven in a direction such that the upper flight moves toward the outer end of the discharge platform. The bale is also brought into engagement with the vanes 30a which are rotating with the shaft carrying the inner sprocket wheel 37.

The vanes 30a assist in the transition of the bale from the elevating conveyor onto the discharge platform and conveyor. In addition, and in the case of round bales, they assist in preventing the teeth of the discharge conveyor from tearing or displacing the tie string of the round bale. It sometimes happens that without the vanes 30a and with round bales which are wrapped with spiral tie, the teeth will engage the tie alone and will tend to pull it rather than the whole bale. Accordingly, we prefer to include, and in fact obtain better operation with both type bales with the vanes 30a.

The discharge conveyor can handle various thicknesses of bales, due to the fact that the guide means 22 is mounted for pivotal movement so that the distance between the guide means and discharge conveyor can be increased and decreased as the bale thickness or position changes. The guide means is continually biased downwardly by means of the biasing assemblies 25. The bale continues to advance on the discharge platform until it reaches the outer end, at which time it will be driven free and will tumble toward the bed of the vehicle.

It will be evident that bales can successively be picked up as the unit advances and that they will be automatically elevated and laterally transported without requiring the presence of an individual on the vehicle bed or at the upper end of the unit.

As earlier noted, in order to change the angular position of the discharge platform with respect to the bale loader, it is necessary only to release chain 34 from the engaging member 36, reposition the platform, and reengage the chain. The platform can be raised or lowered. The guide means will continue to operate in the fashion described, since it is permitted freedom of movement with respect to the discharge platform at various positions for the platform.

When it is desired to transport the machine to another field, the platform can be collapsed to a position illustrated at 23a in FIG. 2, by simply disengaging the chain and letting the platform drop. It will be noted that when in the lowered position, the discharge platform lies within the widthwise dimensions of the bale loader as a whole; in other words, the width of the basic bale loader is not increased when the platform is in the collapsed position.

From the foregoing, it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. In a field bale-loading machine having an upright mobile frame and bale elevating conveyor, the improvement comprising:

a discharge platform extending to one side of the upper end of the frame, said discharge platform connected to the frame and supportable at different positions with respect to the frame;

means for supporting the discharge platform at different positions with respect to the frame;

transport means for transporting bales along the discharge platform and for discharging said bales over the end of the discharge platform, said transport means movable with said platform; and means for guiding bales from the elevating conveyor onto the discharge platform and for biasing bales toward the transport means regardless of the position of the latter with respect to the frame 2. The improvement as in claim 1, said discharge platform pivotally connected with the frame and supportable at different angles of inclination with respect to the frame.

3. The improvement as in claim 1, said transport means for transporting and for discharging bales comprising an endless, multitoothed discharge conveyor associated with the discharge platform.

4. The improvement as in claim 3, said discharge conveyor driven by the elevating conveyor.

5. The improvement as in claim 1, said last named means including a member having a bale guiding surface pivotally connected to the frame and movable in response to movement of the discharge platform with respect to the frame.

6. The improvement as in claim 1, said last-named means including a member having a bale-biasing surface.

7. The improvement as in claim 1, said last-named means including a curvilinear member having a bale-guiding surface and a bale biasing surface pivotally connected to the frame and movable in response to movement of the discharge platform with respect to the frame.

8. The improvement as in claim 1, said last-named means including assemblies for biasing bales toward the discharge platform and a member having a bale-biasing surface, said assemblies connected to said member having a bale-biasing surface and operable to permit reciprocal movement of said member with respect to the discharge platform.

9. The improvement as in claim 1, wherein a rotary shaft, having a plurality of elongated vane members attached thereto, supplements said means for transporting bales and assists said last named means in guiding bales onto said discharge platform.